United States Patent [19]

Hosaka et al.

[11] Patent Number: 5,309,507
[45] Date of Patent: May 3, 1994

[54] DATA COMMUNICATION APPARATUS FOR MAINTAINING DATA INTEGRITY DURING AN INTERRUPTION REQUEST

[75] Inventors: Ryuji Hosaka; Naoki Suto; Tomoo Fukao; Naoharu Kodo; Kazuyuki Tsukamoto; Minoru Yoshida, all of Saitama, Japan

[73] Assignee: Fuji Xerox Co., Ltd., Tokyo, Japan

[21] Appl. No.: 774,920

[22] Filed: Oct. 11, 1991

[30] Foreign Application Priority Data

Jan. 24, 1991 [JP] Japan .................................. 3-022581
Feb. 6, 1991 [JP] Japan .................................. 3-035016

[51] Int. Cl.⁵ .......................................... H04M 11/00
[52] U.S. Cl. .................................... 379/96; 379/100; 358/437
[58] Field of Search ........................ 379/93, 94, 96–98, 379/100, 201, 205, 212, 215, 53, 54; 358/400, 405, 437, 439, 441, 434; 375/8, 121

[56] References Cited

U.S. PATENT DOCUMENTS

| 4,807,276 | 2/1989 | Okabe ................................. | 379/100 |
| 4,878,123 | 10/1989 | Miura et al. ......................... | 379/100 |
| 5,032,929 | 7/1991 | Asano et al. ......................... | 358/439 |
| 5,081,539 | 1/1992 | Kaneko ............................... | 358/437 |
| 5,179,410 | 1/1993 | Farrell et al. ......................... | 358/405 |

FOREIGN PATENT DOCUMENTS

| 52-54316 | 5/1977 | Japan ................................. | 358/405 |
| 58-59669 | 4/1983 | Japan ................................. | 358/405 |
| 60-244155 | 12/1985 | Japan ................................. | 358/405 |
| 60-259049 | 12/1985 | Japan ................................. | 358/437 |
| 62-216584 | 9/1987 | Japan . | |
| 64-78575 | 3/1989 | Japan . | |
| 64-86660 | 3/1989 | Japan . | |

Primary Examiner—Wing F. Chan
Attorney, Agent, or Firm—Finnegan, Henderson, Farabow, Garrett & Dunner

[57] ABSTRACT

In a data communication apparatus, when detecting a "catch phone" signal sent out from an exchange, a receiving station requests a transmitting station to resend data by use of protocol information. At the transmitting station, the data resending request is detected in a protocol information analyzing unit, and a predetermined unit of data which was transmitted immediately before the present time is resent. The receiving station has a page deleting unit to save the memory area used to store the data resent and avoid printing of unnecessary data. The page deleting unit enables deletion of data received when a "catch phone" call comes in and permits the resent data to be effectively stored in a memory. Also, in the apparatus, a "catch phone" detecting unit in a transmitting station detects that a circuit connection request comes in from a third station on the basis of a "catch phone" signal sent out from an exchange. A page-end detecting unit detects completion of transmission of a predetermined unit of data. A condition judging unit automatically decides whether to open the circuit or not on the occasion of resending data in accordance with the state of a "catch phone" detecting signal "a" and a page-end detecting signal "b". If the page end is detected in a short time after the detection of a "catch phone" signal, the circuit is not opened. If the "catch phone" signal has continued when the page end is detected, after the circuit is temporarily opened, resending of data is executed.

5 Claims, 9 Drawing Sheets

PICTURE INFORMATION
RESENDING REQUEST
1 : YES
0 : NO

DATA COMMUNICATION APPARATUS FOR MAINTAINING DATA INTEGRITY DURING AN INTERRUPTION REQUEST

BACKGROUND OF THE INVENTION

The present invention relates to a data communication apparatus and, more particularly, to a data communication apparatus that processes an interruption caused by a third station during communication of data.

This is a type of communication system in which image data is exchanged between facsimile apparatuses, or information processing apparatuses including personal computers, are connected together by a telephone circuit to exchange data. In such a communication system, during the communication of data between two stations, a circuit connection request is made from a third station other than the transmitting and receiving stations. A facsimile apparatus processing such a circuit connection request, is disclosed in Japanese Unexamined Publication No. Sho. 62-216584.

In this facsimile apparatus, when a circuit connection request signal is received, the present communication is temporarily suspended and the telephone number of the third station requesting circuit connection is stored in memory. The data communication, which has been suspended, is resumed, and after the completion of this data communication, the stored telephone number is automatically dialed to call the third station.

Further, there have been proposed a facsimile transmitter and a data communication system (Japanese Patent Unexamined Publication Nos. Sho. 64-78575 and Sho. 64-86660) wherein, when an interruption such a circuit connection request is received, the present communication is immediately suspended and switched to communication with the third station.

In the above transmitter and communication system, when an interrupt signal from the third station is received during data transmission or when an operator instructs an interruption during data transmission to execute an interruption processing, the circuit is cut off to suspend the data communication. After the execution of a given interruption processing, the data communication, which has been suspended, is automatically resumed.

As the above circuit connection request signal, a "catch phone" signal used in the service provided by NTT (Nippon Telegraph & Telephone K.K.) is known. In the "catch phone" service, when a circuit connection request is made from the third station, a call signal ("catch phone" signal) that inform the operator of the circuit connection request is sent out from an exchange. The "catch phone" signal is a signal of frequency 400 Hz which is interrupted at predetermined intervals.

In addition to the "catch phone" signal, various call signals are known, which are selectively used in accordance with the type of exchange used. For example, a call signal used in ATT, U.S.A., is a hybrid signal which comprises two signals of 480 Hz and 620 Hz and is output at 60 IPM. In addition, voice or music has recently been used as a call signal and a holding signal that is generated when the called party responds to the call signal.

When a "catch phone" signal comes in to inform the operator that a circuit connection request is being made from a third station, noise may enter the data which is being transmitted due to the "catch phone" signal. For example, in a facsimile communication, picture information is transmitted by use of a frequency band of 0.3 to 3.4 kHz. Therefore, the frequency (400 HZ) of the "catch phone" signal is included in the occupied bandwidth of the facsimile communication, so that the transmitted picture information may be disturbed by the "catch phone" signal.

When the present communication continues without responding to the call from the third station, it is likely that all the picture information received while the call is continuing will be adversely affected by the "catch phone" signal.

When the apparatus or system disclosed in the above-mentioned publications (Japanese Unexamined Publication Nos. Sho. 64-78575 and Sho. 64-86660) is employed, the circuit is cut off and it is therefore possible to minimize the disturbance of the information. However, the prior art involves some problems because the present communication is suspended on every interruption.

More specifically, during the suspension of the communication, a call from another station may come in the remote station which is kept suspended in the middle of the communication. In such a case, a great deal of time may be needed for redialing, or it may be impossible to connect the circuit with the remote station for a while. Thus, there are cases where it is better not to suspend the present communication unconditionally when a "catch phone" signal comes in.

However, no consideration has previously been given to not suspending communication in the conventional apparatus and communication system. Thus, the prior art suffers from the problem that the circuit is switched over instantly when an interrupt occurs.

SUMMARY OF THE INVENTION

It is an object of the present invention to provide a data communication apparatus which is capable of obtaining normal data even when a call from the third station is received during data communication, thereby solving the above-described problems of the prior art.

It is another object of the present invention to provide a data communication apparatus which is capable of continuing a present communication as long as possible and transmitting normal data, which is free from disturbance, even when a "catch phone$, signal comes in, thereby solving the above-described problems of the prior art.

According to a first aspect of the present invention, a data communication apparatus comprises a means for detecting an interruption request signal received during reception. In response to detecting an interruption request signal from the detecting means, the remote station is requested, by use of protocol information, to resend the data received when the interruption request signal was detected. The data communication apparatus may comprise a means for informing an operator that the data resending request has been sent. Further, the data communication apparatus may comprise a means for storing received data and a means for erasing data received at the time of detection of the interruption request signal in the stored data.

According to a second aspect of the present invention, a data communication apparatus comprises a means for storing data transmitted and a means for detecting a resending request signal from a remote station included in the protocol information and the apparatus is arranged such that in response to a detected resending request signal, a predetermined unit of data transmitted immediately before the reception of the resending request signal is read out from the data storing means and sent out to the remote station.

According to the present invention as described above, when a "catch phone" signal, for example, is received as an interruption request signal, information is sent out to the transmitting station to request it to resend the data of the page received when the "catch phone" signal was received. In response to the resending request information, the transmitting station resends the data.

The operator at the receiving station can recognize by the information displayed by the informing means that two pieces of data have been transmitted in superposed form because of the incoming of a "catch phone" call.

In addition, it is possible to erase the data that is received at the time of reception of a "catch phone" signal and temporarily stored in the received data storing means. The resent data can replace the erased data in the storing means.

According to a third aspect of the present invention, a data communication apparatus comprises a means for detecting generation and disappearance of a circuit connection request signal from a third station received during transmission of data, means for detecting the completion of a transmission of a predetermined unit of data, and condition judging means for judging whether or not the sequence relationship between the completion of transmission of a predetermined unit of data and the disappearance of the circuit connection request signal satisfies predetermined conditions, wherein predetermined processings including a processing of resending at least a predetermined unit of data transmitted at the time of generation of the circuit connection request signal are executed in accordance with the result of the judgement made by the condition judging means.

According to the present invention having the above-described features, it is possible to detect that a circuit connection request is made from the third station on the basis of a "catch phone" signal, for example, and resend data by a predetermined procedure in accordance with the result of judgment of the sequence relationship between the time when the transmission of a predetermined unit of data is completed and the time when the circuit connection request disappears.

DETAILED DESCRIPTION OF THE INVENTION

The present invention will be described in detail with reference to the accompanying drawings.

Figure 3:
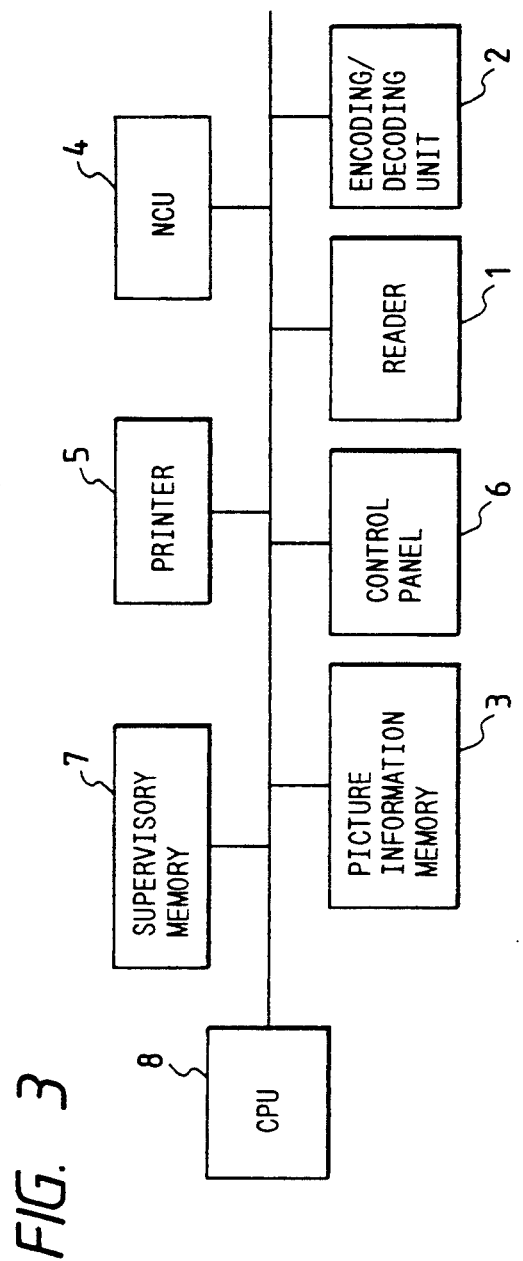
FIG. 3 is a block diagram showing the hardware arrangement of a facsimile apparatus.

FIG. 3 is a block diagram showing the hardware arrangement of a facsimile apparatus relating to embodiments of the present invention. In the figure, picture information read from an original document by a reader 1 is encoded in an encoding and decoding unit 2 and stored in a picture information memory 3. The picture information stored is sequentially sent out to a circuit through a network control unit (NCU) 4.

During reception, picture information that is taken in from the circuit is temporarily stored in the picture information memory 3 and then decoded in the encoding and decoding unit 2 and printed out by printer 5. A control panel 6, which has a keyboard and a display, is used to input various kinds of instruction and to display processing results. The above-described elements are each controlled by a CPU 8 according to a program and supervisory data stored in a supervisory memory 7.

Figure 1:
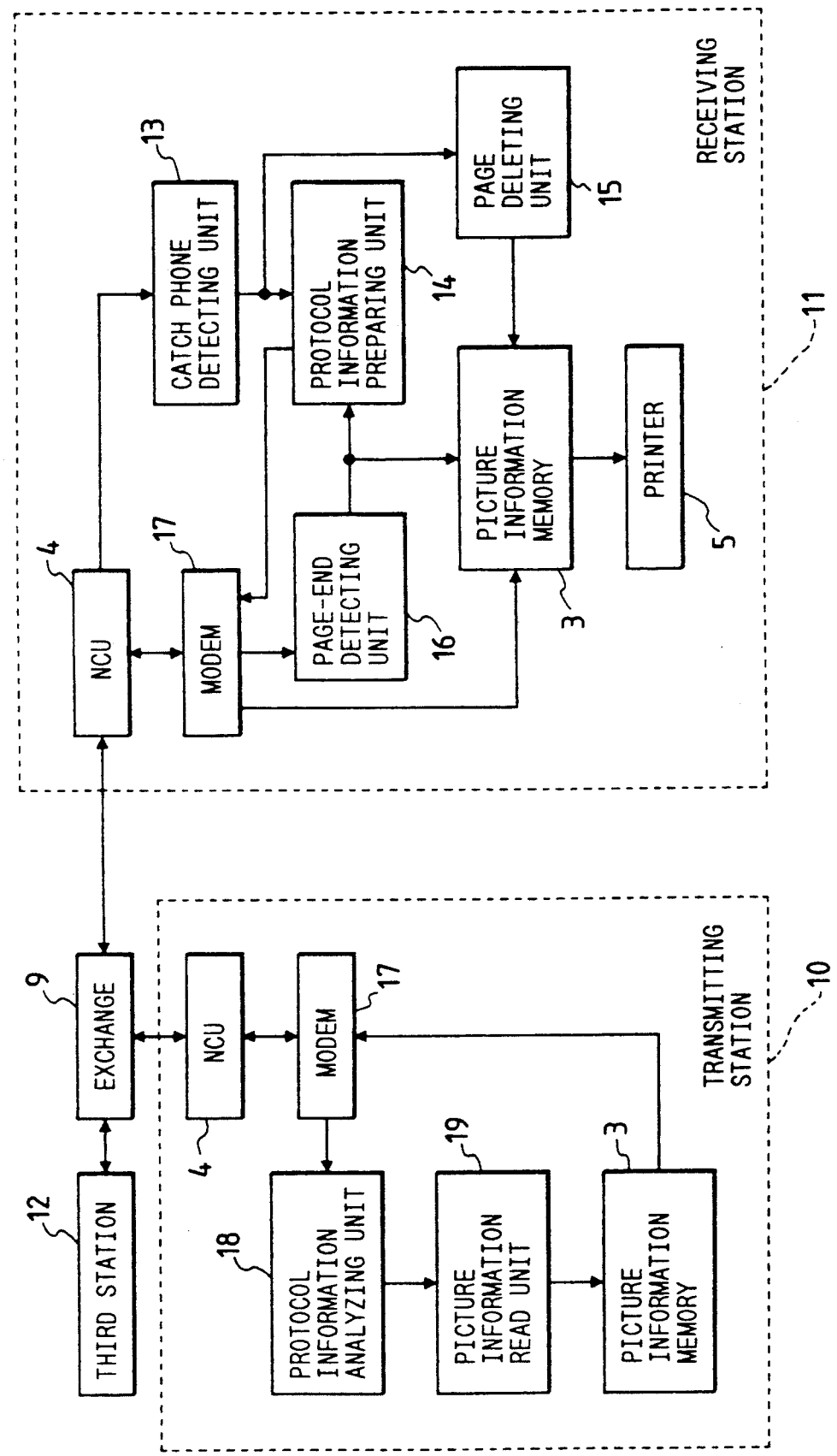
FIG. 1 is a block diagram showing essential functions of a control section according to a first embodiment of the present invention.

FIG. 1 is a block diagram showing essential functions of a first embodiment. In the figure, an exchange 9 is connected with a facsimile apparatus 10, a facsimile apparatus 11 as a remote station with respect to the facsimile apparatus 10, and a third station 12, which have the above-described hardware arrangements. In this embodiment, the third station 12 is a facsimile apparatus. The exchange 9 is also connected with many other data communication apparatuses such as telephones and facsimile apparatus, as a matter of course. The following description will be made on the assumption that the facsimile apparatus 10 is a transmitting station, and the facsimile apparatus 11 a receiving station.

It should noted that elements of the transmitting station 10 and the receiving station 11 denoted by the same reference numerals are the same or equivalent elements.

In the first embodiment, memory reception is executed in which picture information received at the receiving station is temporarily stored in the picture information memory 3, and after all picture information has been received, the stored picture information is output on the printer 5.

When a circuit connection request is received from the third station 12 while the receiving station 11 is executing memory reception of picture information sent out from the transmitting station 10, the following processing is executed at each station.

Upon receipt of a circuit connection request signal, the exchange 9 sends out a "catch phone" signal to the receiving station 11. The "catch phone" signal that is input to the network control unit (NCU) 4 in the receiving station 11 is recognized as a "catch phone" signal in a "catch phone" detecting unit 13. The "catch phone" signal is an interrupted signal of 400 Hz. Accordingly, the "catch phone" detecting unit 13 monitors the spectrum of the input signal and judge the occasion on which the signal of 400 Hz is markedly stronger in the spectrum than other signals and interrupted at predetermined intervals indicating a "catch phone" signal.

A "catch phone" signal detection in the "catch phone" detecting unit 13 is reported to both a protocol information preparing unit 14 and a page deleting unit 15 by a "catch phone" detecting signal.

The protocol information preparing unit 14 that is supplied with the "catch phone" detecting signal prepares protocol information, including facsimile information because when a "catch phone" signal is detected, the page that was transmitted immediately before the present time must be resent on the basis of a frame arrangement (described later). When a page-end detecting unit 16 detects that the reception of picture information for one page has been completed, the protocol information is sent out to the circuit through a modem 17 and the NCU 4 at the time of the detection of the page end, that is, at a point between a pair of adjacent pages.

In response to the "catch phone" detecting signal, the page deleting unit 15 outputs a page deleting signal to the picture information memory 3. The page deleting signal is validated at the time of detection of the page end to delete the latest picture information for one page, which has been stored in the picture information memory 3.

Meanwhile, the protocol information that includes information requesting resending of the picture information is detected in a protocol information analyzing unit 18 in the transmitting station 10. When recognizing the resending request information from the receiving station 11, the protocol information analyzing unit 18 outputs a detecting signal to a picture information read unit 18. In response to this detecting signal, the picture information read unit 18 outputs a read signal to the picture information memory 3. The picture information memory 3 in the transmitting station 10 stores all picture information read from the original document and to be transmitted. In response to the read signal, the picture information memory 3 outputs to the modem 17 the picture information for one page transmitted immediately before the present time. The picture information output to the modem 17 is sent out to the circuit through the NCU 4 and then received at the receiving station 11 through the exchange 9. If no "catch phone" call is received during the re-reception of the picture information, the picture information re-received is stored as normal data in the picture information memory 3, and the operation then shifts to reception of the subsequent information.

Figure 2:
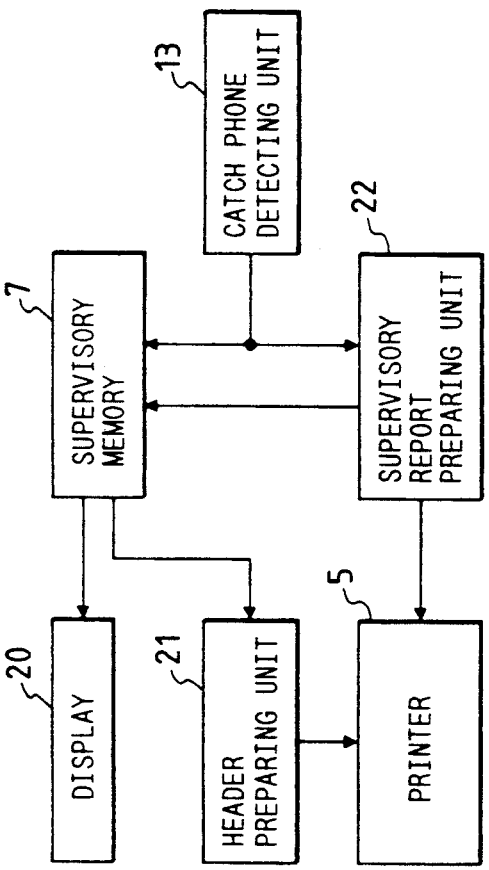
FIG. 2 is a block diagram showing essential functions of a control section according to a second embodiment of the present invention.

A second embodiment in which picture information is received without performing memory reception, will next be explained. FIG. 2 is a functional block diagram of a receiving station, which shows the essential parts of the second embodiment.

In the reception of picture information that is executed without performing memory reception, picture information received is temporarily stored in a buffer and then sequentially printed out. In this case, when a "catch phone" call is received, a received picture affected by the "catch phone" signal and a normal picture resent are printed out. Accordingly, the second embodiment is arranged to enable the operator at the receiving station 11 to recognize that an extra received picture has been printed because of a "catch phone" call coming in during the reception.

More specifically, the supervisory memory 7 in FIG. 2 has previously been stored with data for displaying on a display 20 a message such as "There is a "catch phone" call." and for outputting such as message as header information. The supervisory memory 7, in response to the "catch phone" detecting signal, outputs data indicative of the above message to both the display 20 and a header preparing unit 21.

The display 20, which is, for example, an LCD, displays a predetermined message indicative of reception of a "catch phone" signal on the basis of the data input thereto from the supervisory memory 7. The header preparing unit 21 adds the above message as header information to the top of a page which is re-received, on the basis of the input data.

Further, a supervisory report preparing unit 22 prepares a supervisory report based on the "catch phone" detecting signal supplied from the "catch phone" detecting unit 13 and stores it in a supervisory report storing region in the supervisory memory 7 in the same way as other supervisory reports. The supervisory report may be not only character information such as the above-described message but also a predetermined code. The supervisory report is printed out from the printer 5 in response to an operator's instruction that is input from the control panel 6 or at the time when a predetermined number of communication processings have been executed.

It should be noted that the display of information on the display 20, the header information and the record on the supervisory report to the effect that there is a "catch phone" call are merely illustrative examples and that the display of the above information may be effected by use of a proper, known display means, for example, an LED lamp.

Figure 4:
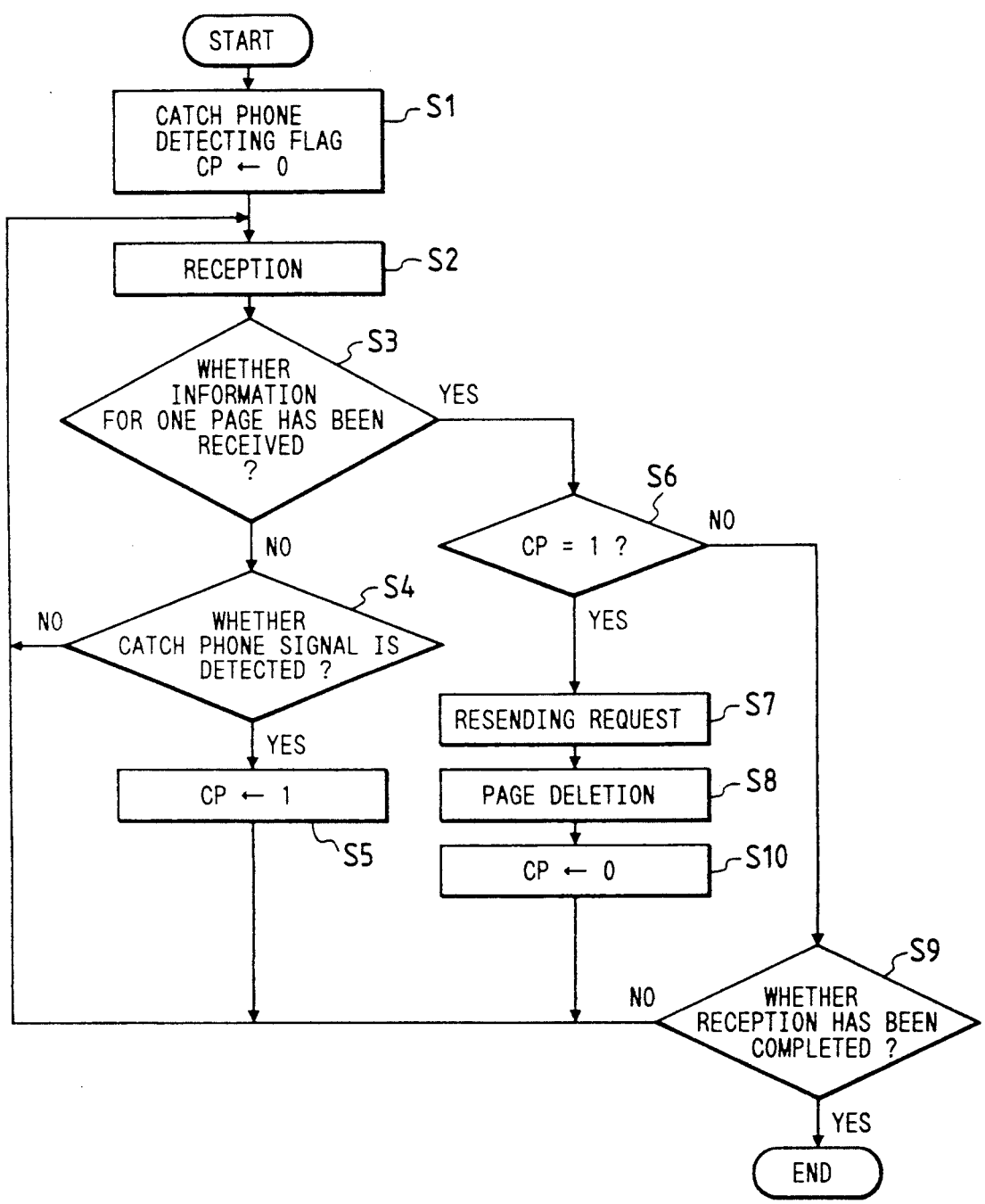
FIG. 4 is a flowchart showing the operation of the receiving station.
Figure 5:
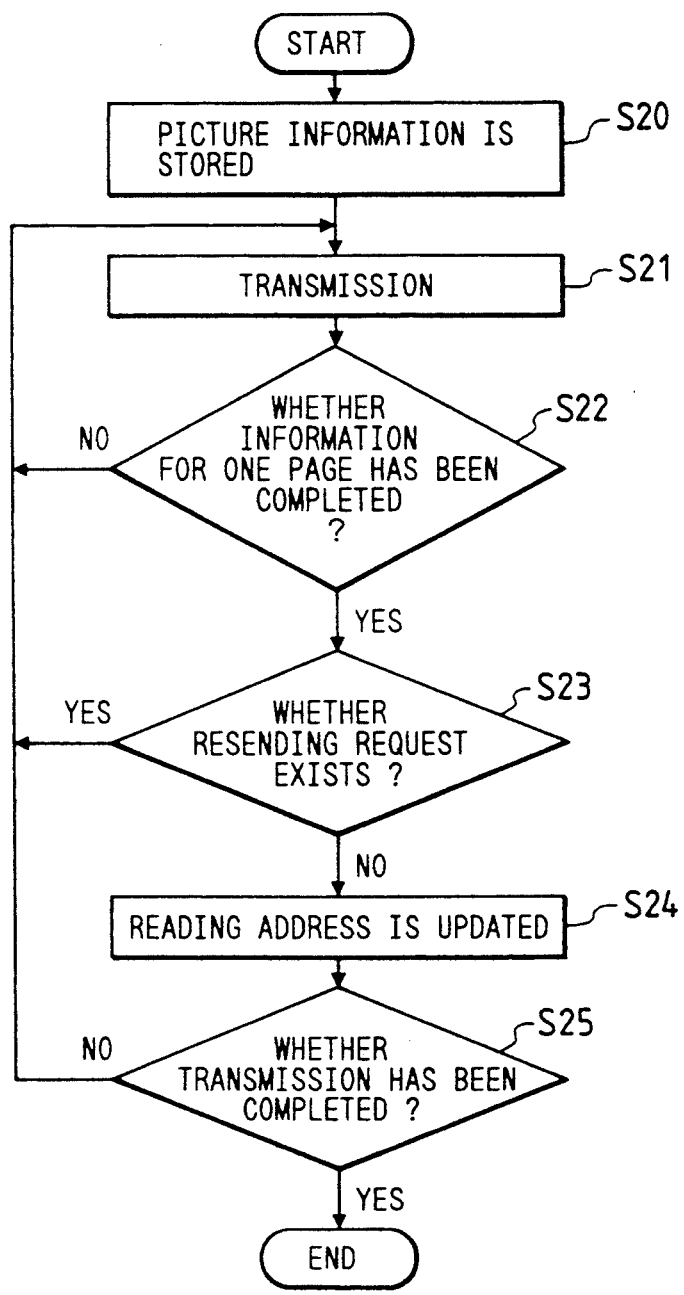
FIG. 5 is a flowchart showing the operation of the transmitting station.

The operations of the embodiments will be explained reference to flowcharts. FIGS. 4 and 5 are flowcharts showing the respective operations of the two embodiments.

The operation of the receive 11 during memory reception (embodiment 1) will first be explained with reference to FIG. 4.

At Step S1, a flag CP indicating that a "catch phone signal was detected is cleared (i.e., "0" is set).

At step S2, reception of picture information is initiated, and it is judged at Step S3 whether or not picture information for one page has been received. If NO, the process proceeds to Step S4, where it is judged whether or not a "catch phone" signal is detected.

If a "catch phone" signal is detected, the process proceeds to Step S5, where a "catch phone" detecting flag CP is set (i.e. "1" is set). On the other hand, if no "catch phone" signal is detected, the process returns to Step S2.

If YES is the answer at Step S3, that is, if the reception of picture information for one page has been completed, the process shifts to Step S6, where it is judged from the state of the "catch phone" detecting flag CP whether or not a "catch phone" call was detected in the preceding reception. If the flag CP is set, the process proceeds from Step S6 to Step S7.

As Step S7, a picture information resending request is made by use of protocol information.

At Step S8, the picture information for the one page received immediately before the detection of the "catch phone" signal is deleted, and the flag CP is reset at Step S10. Thereafter, the process returns to Step S2 to receive picture information which is transmitted on the basis of the above-described resending request.

If the flag CP is not set, the process proceeds to Step S9, where it is judged whether or not the reception of all picture information has been completed. This judgement is made by deciding whether or not there is a multi-page signal MPS sent from the transmitting station 10. If it is judged that the reception has been completed, the processing is terminated, whereas, if there is another page to be received, the process returns to Step S2.

The foregoing description also applies in the case of memory reception. In contrast to this, reception that is executed without performing memory reception (second embodiment), a processing for informing the operator of the reception of a "catch phone" call is executed in place of the page deleting processing carried out at Step S8. More specifically, at Step S8, for example, the message to the effect that "There is a "catch phone" call" is displayed on the display 20, or header information is added to picture information received at Step S2.

The operation of the transmitting station 10 will next be explained with reference to FIG. 5.

At Step S20, picture information is read from the original document and stored in the picture information memory 3. At Step S21, transmission of the stored picture information is initiated.

It is judged at Step S22 whether or not the transmission of picture information for one page has been completed. If NO, the process returns to Step S21, whereas, if YES, the process proceeds to Step S23, where it is judged whether or not the facsimile information sent from the receiving station 11 includes a picture information resending request. If YES, the process returns to Step S21 to resend the picture information.

If there is no resending request, the process proceeds to Step S24, where the address for reading picture information from the picture information memory 3 is updated to prepare for transmission of picture information of the next page.

It is judged at Step S25 whether or not the transmission of all the picture information stored has been completed. If YES, the processing concerned is terminated, whereas, if there is another page to be transmitted, the process returns to Step S21.

After the address is updated at Step S24, the picture information of the next page is transmitted at Step S21.

Figure 6:
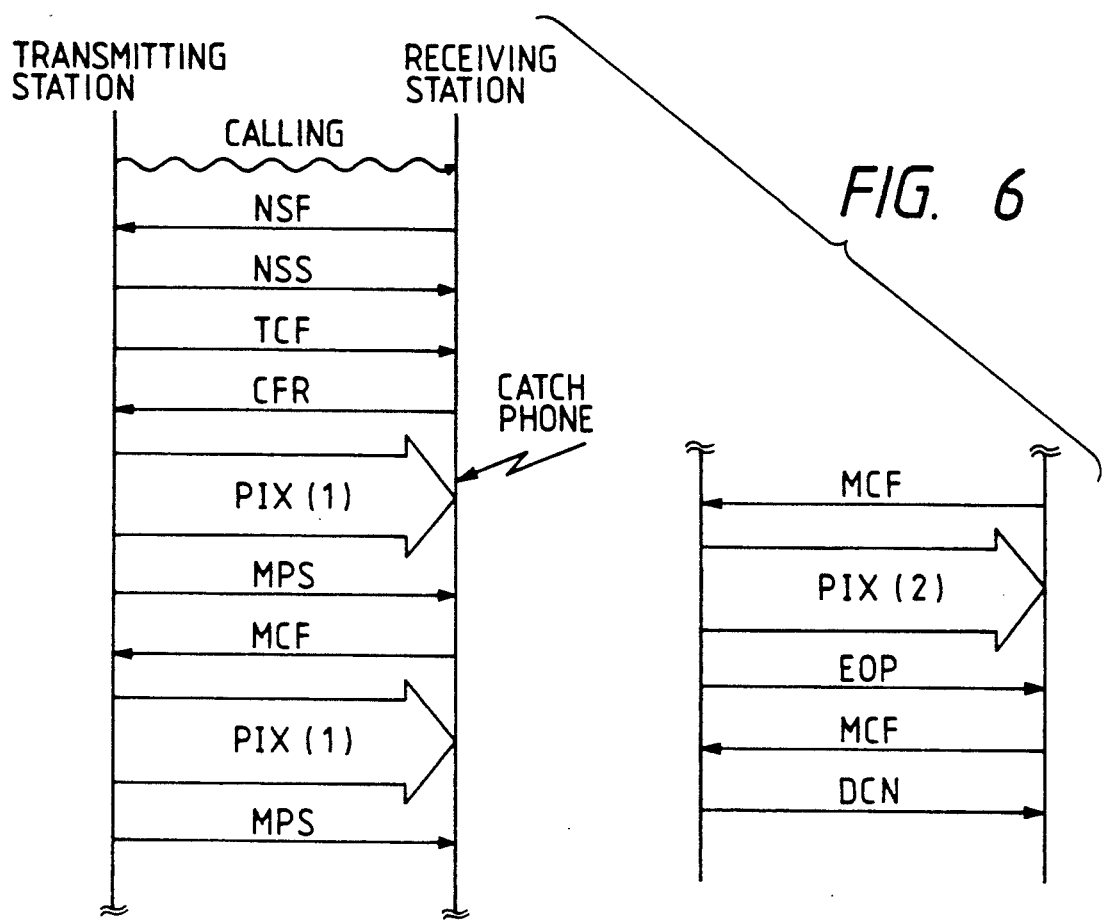
FIG. 6 is a sequence chart showing a protocol, FIG. 7 exemplarily shows the frame arrangement of protocol information.

FIG. 6 shows the protocol communication in the above-described transmission and reception of picture information. Referring to FIG. 6, procedures of phases A and B according to CCITT, T30 are first carried out to send out picture information PIX(1). If a "catch phone" call comes in the receiving station during the transmission of the picture information PIX(1), the receiving station makes a resending request to the transmitting station by use of protocol information at the time when the reception of the picture information PIX(1) has been completed.

Figure 7:
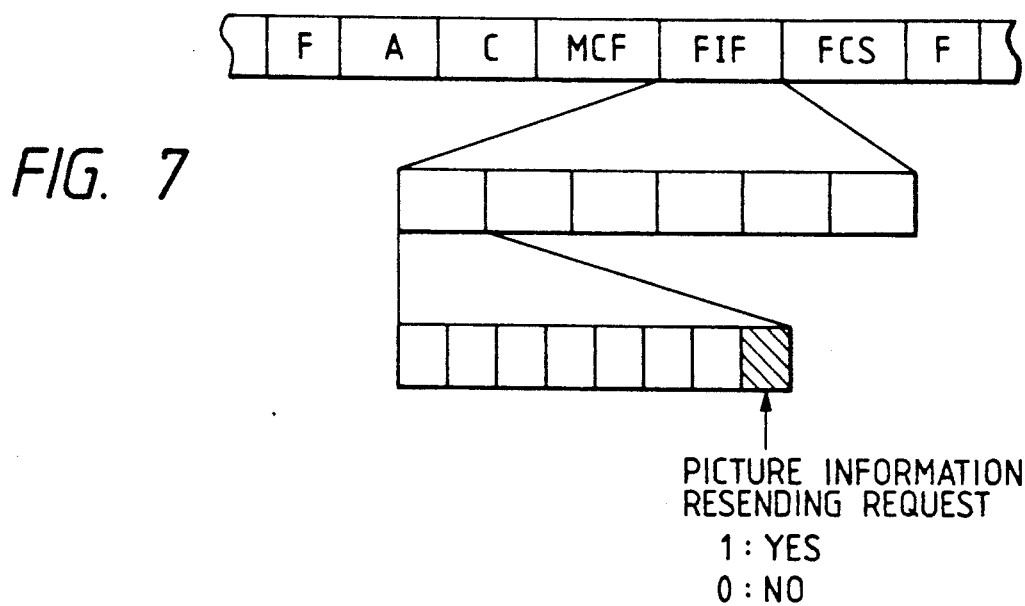

FIG. 7 exemplarily shows the frame arrangement of protocol information used to make a resending request. As is illustrated in the figure, a resending request is added to a facsimile information filed FIF of a message confirmation signal MCF. For example, one bit of the facsimile information field FIF is designated as "1" or "0" to inform the transmitting station whether or not there is a resending request. When informed of the resending request, the transmitting station resends the picture information PIX(1).

In FIG. 6, after the picture information PIX(1) has been resent, picture information PIX(2) is sent out through a predetermined procedure. Since in this embodiment the picture information PIX(2) is assumed to be the final picture information, procedures of phases D and E are executed to complete the communication.

In the foregoing embodiments, the present invention has been described separately in regard to the memory reception and the reception executed without performing memory reception. In the case of the memory reception no means for displaying the reception of a "catch phone" call is provided. However, the reception of a "catch phone" call may also be displayed in the case of the memory reception.

Although in the foregoing, the page deleting processing is executed when a resending request is made, the execution of the page deleting processing is not necessarily limited to this occasion. For example, after picture information resent has been stored, the picture information previously stored may be deleted. If the picture information memory has a sufficiently large storage capacity, the deletion of page does not necessarily need to be executed.

Similarly, the display of the reception of a "catch phone" call need not be performed by using all the three means, that is, the display on the display unit, the display by use of header information, and the display by use of a supervisory report, and these three means may be selectively used.

It should be noted that, whether to make the above-described resending request or may not be decided by the operator in advance. More specifically, there are cases where picture information can be satisfactorily used even if it is somewhat disturbed, depending upon the kind of information to be transmitted; therefore, in some cases it may be convenient if it possible to selectively decide whether to make the above-described resending request or not. Setting of such a decision may be made use of the keyboard on the control panel. When such a selecting means is employed, it is preferable to provide a means for displaying the selected mode.

Although in the foregoing embodiments the communication of picture information between facsimile apparatus has been exemplarily described, it is also possible to execute processing in the same way as in the described embodiments in data communication between data communication apparatuses in which personal computers are used as terminal devices.

In the foregoing embodiments the "catch phone" signal used in the service provided by Nippon Telegraph & Telephone K.K., i.e., an interrupted signal of 400 Hz, is assumed to be an interrupt signal, and the apparatus is arranged to avoid the disturbance of the received picture information by this interrupt signal. However, the interrupt signal is not necessarily limited thereto, and the present invention may also be applied to other signals, for example, a call signal used in ATT, U.S.A., which comprises two signals of 480 Hz and 620 Hz that are combined together and which is output at 60 IPM. More specifically, by arranging the "catch phone" detecting unit 13 to detect this call signal, it is possible to execute the processings shown in the foregoing embodiments and obtain the same advantageous effects as those in the embodiments.

As is clear from the foregoing description, according to the embodiments of the present invention, when an interrupt signal is received by the receiving station during a data communication, it is possible to detect the interrupt signal and make a data resending request to the transmitting station. Accordingly, in response to this request the transmitting station can resend a predetermined unit of data, e.g., picture information for one page, which was transmitted immediately before the present time, so that it is possible to obtain communication data which is free from the effect of the interrupt signal.

In addition, since the operator can be informed of the reception of the interrupt signal, the operator can understand the reason why data, e.g., picture information has been resent.

Figure 8:
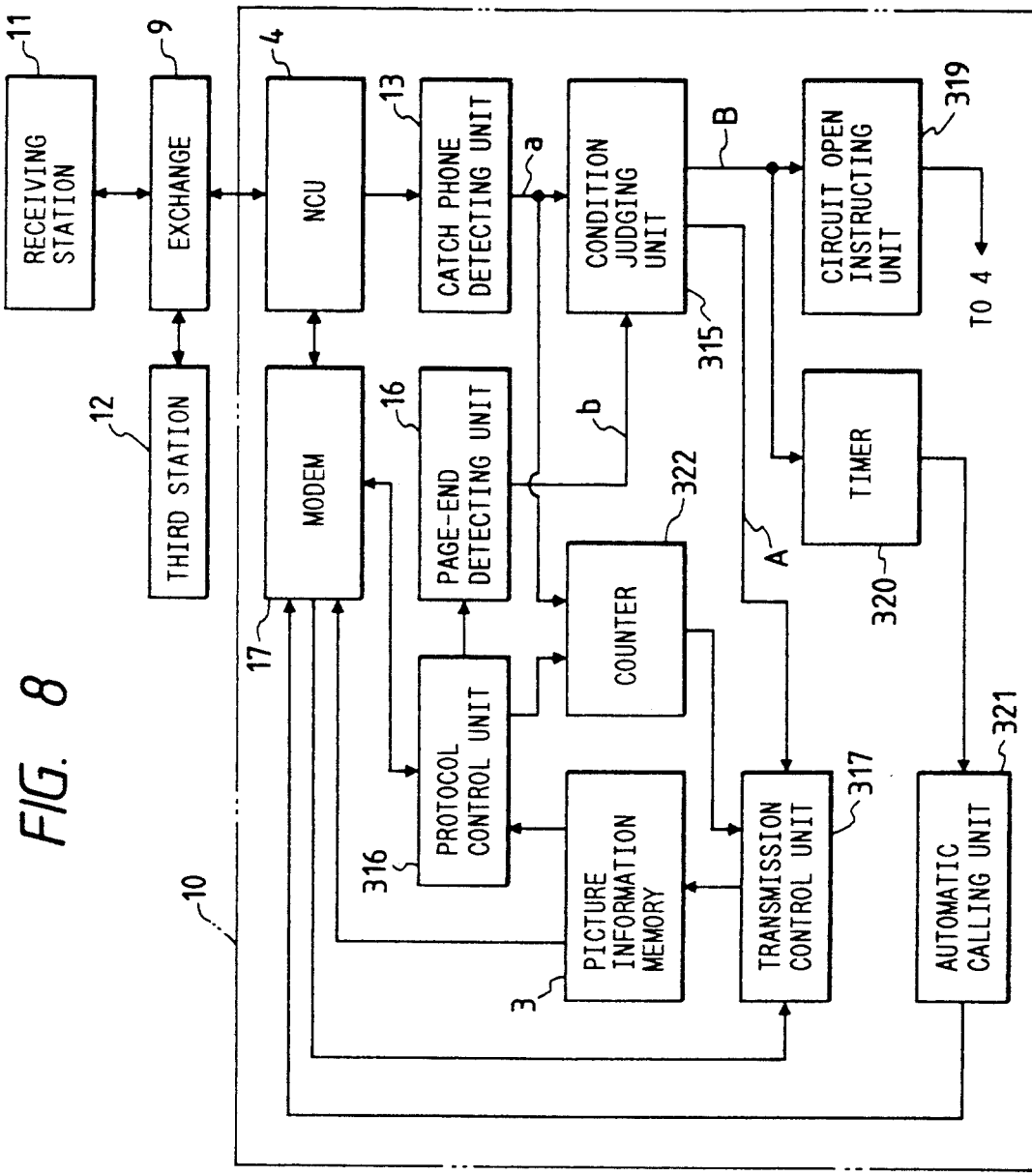
FIG. 8 is a block diagram showing essential functions of a third embodiment of the present invention.

FIG. 8 is a block diagram showing essential elements of a third embodiment, in which the same reference numerals as those in FIG. 1 denote the same or equivalent elements.

When a circuit connection request to the transmitting station 10 comes in from the third station 12 during picture communication between the transmitting and receiving stations 10 and 11, a "catch phone" signal is output from the exchange 9 to the transmitting station 10.

The "catch phone" signal that is input to the network control unit (NCU) 4 is recognized as a "catch phone" signal in a "catch phone" detecting unit 13. When no "catch phone" signal is detected, the level of an output signal "a" from the "catch phone" detecting unit 13 is low, i.e., "0", whereas, while a "catch phone" signal is being detected, the level of the signal "a" is high, i.e., "1".

A page-end detecting unit 16 monitors the output from a protocol control unit 316. When the page-end detecting unit 16 detects a page-end signal that is output from the protocol control unit 316 when picture information for one page of the original document has been sent out, the unit 16 changes the output signal "b" from the low level to the high level.

The output signals "a" and "b" from the "catch phone" detecting unit 13 and the page-end detecting unit 16 are supplied to a condition judging unit 315. The condition judging unit 315 judges whether or not predetermined conditions are satisfied on the basis of the levels of the signals "a" and "b" supplied thereto from the two detecting units 13 and 16.

More specifically, if the "catch phone" signal disappears (i.e., the signal "a"=0) and a page-end signal is detected upon the completion of transmission of picture information for one page (i.e., the signal "b"=1), a first condition signal A is output. If the "catch phone" signal is continuously detected (i.e., the signal "a"=1) and a page-end signal is detected (i.e., the signal "b"=1), a second condition signal B is output.

A counter 322 is a means for indicating the page in the original document of picture information which is presently transmitted. The count value is updated by detecting the initiation of transmission of picture information for each page that is obtained from the protocol control unit 316. The count value on the counter 322 is output to a transmission control unit 317 when "catch phone" signal is detected (i.e., the signal "a"=1). The count value is stored in the transmission control unit 317 and used as data for identifying picture information transmitted at the time of resending.

When the first condition signal A is supplied to the transmission control unit 317 from the condition judging unit 315, the transmission control unit 317 gives an output instruction to the picture information memory 3 to resend the picture information for the one page that was sent out immediately before the present time, that is, the picture information indicated by the count value stored when the "catch phone" signal was detected. In response to the output instruction signal, the picture information memory 3 outputs the picture information to a modem 17.

When the second condition signal B is supplied to a circuit open instructing unit 319 from the condition judging unit 315, the unit 319 outputs a circuit open instruction to the NCU 4. At the same time, the second condition signal B is also supplied to a timer 320, which outputs a time-up signal to an automatic calling unit 321 after a predetermined time has elapsed from the time when the second condition signal B was supplied. In response to the time-up signal, the automatic calling unit 321 calls the remote station (the receiving station 11) which was in communication before the circuit was opened. When a signal answering to the call is input from the receiving station 11, the transmission control unit 317 resumes the transmission from the picture information of the page transmitted before the circuit was opened. The reason why automatic calling is delayed by use of the timer 320 is to wait for the "catch phone" signal to stop.

Figure 9:
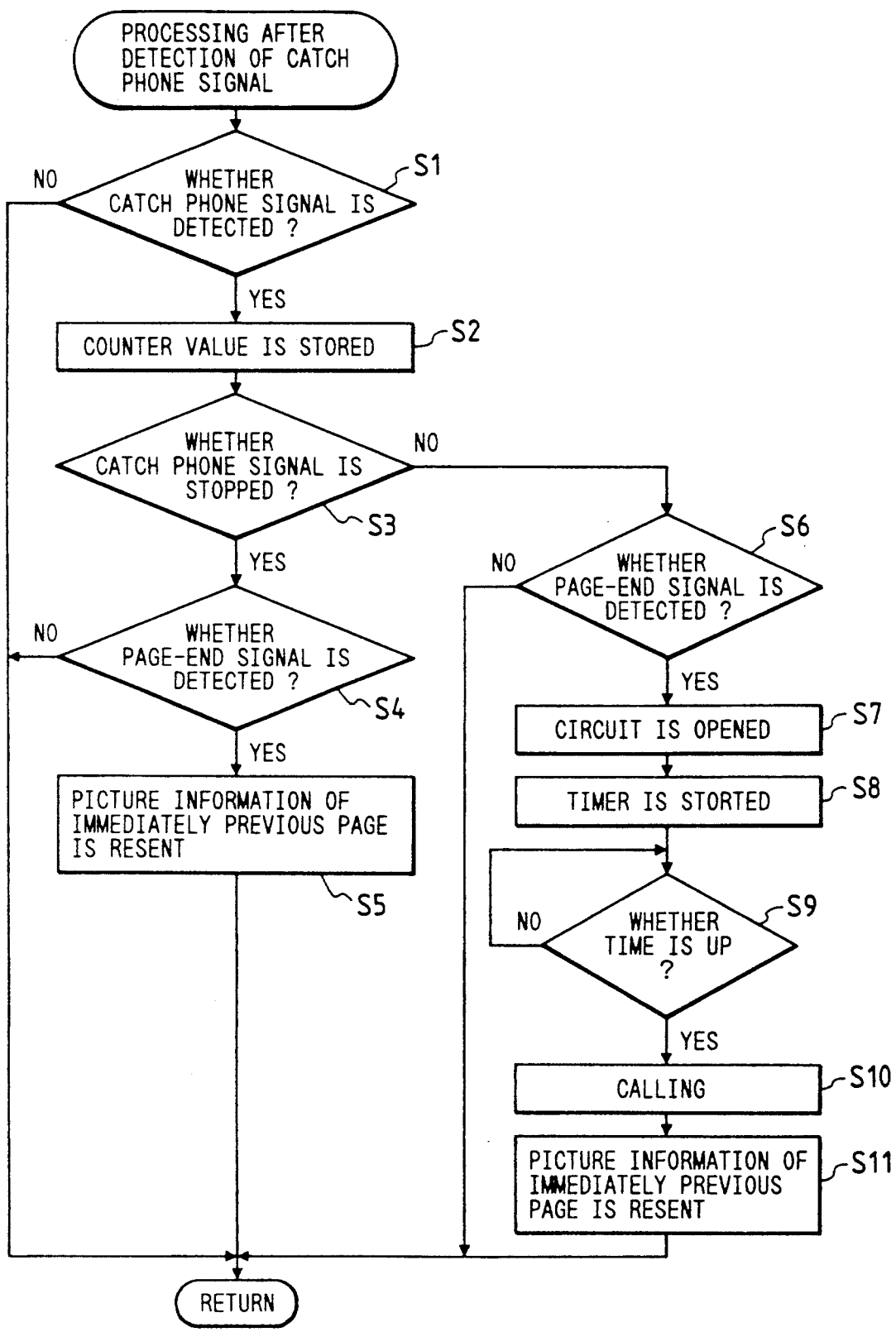
FIG. 9 is a flowchart showing the operation of the third embodiment.

Next, the operation of the third embodiment will be explained. FIG. 9 is a flowchart showing the processing that is executed after the detection of a "catch phone" signal in this embodiment.

Referring to the figure, it is judged at Step S1 whether or not a "catch phone" signal is detected. If a "catch phone" signal is detected, the process proceeds to Step S2, where the value of the counter 322, that is, the value indicative of the page in the original document of the picture information presently transmitted, is stored in the transmission control unit 317.

It is judged at Step S3 whether or not the "catch phone" signal has stopped. If it is judged that the "catch phone" signal has stopped, the process proceeds to Step S4, where it is judged whether or not the communication of the page presently transmitted is completed, that is, detection of a page-end signal is awaited. If a page-end signal is detected and hence the result of the judgement made at Step S4 becomes affirmative, the process proceeds to Step S5. If YES is the answer at Steps S3 and S4, the conditions on which the first condition signal A is output are satisfied. Accordingly, at Step S5 the page number stored at Step S2 is read out and the picture information corresponding to the readout page number, that is, the picture information for one page that was sent out immediately before the present time, is resent.

On the other hand, if it is judged at Step S3 that the "catch phone" signal still continues, the process proceeds to Step S6, where it is judged whether or not page-end signal is detected. If a page-end signal is detected at Step S6, the process proceeds to Step S7. In other words, it is judged that the page end has been reached while the "catch phone" signal is continuing, and the process proceeds to Step S7. If the result of the judgement at Step S3 is negative and the result of the judgement at Step S6 is affirmative, it is judged that the conditions on which the second condition signal B is output are satisfied.

As a result, the circuit is opened at Step S7, and the timer 320 is started at Step S8. It is judged at Step S9 whether or not the time set on the timer 320 is up, that is whether or not a predetermined time has elapsed from the time of starting the timer 320.

If YES is the answer at Step S9, the process proceeds to Step S10, where the subscriber's number of the receiving station 11, which has been stored in a predetermined storage means, is sent out to the circuit (i.e., the receiving station 11 is called).

At Step S11, after it is recognized by the protocol information that the receiving station 11 has responded to the call, the page number stored at Step S2 is read out and the transmission is resumed from the picture information corresponding to the read out page number.

Thus, in this embodiment, when it is judged that the time of reception of a "catch phone" signal is short so that only picture information for one page is affected by the "catch phone" signal" the picture information of this page alone can be resent. On the other hand, when the "catch phone" signal continues longer than the time required to transmit picture information for one page, the circuit is temporarily opened.

A fourth embodiment of the present invention will next be explained. In the fourth embodiment, when a "catch phone" signal is detected, all the picture information transmitted while the "catch phone" signal is being received is resent. Accordingly, if the "catch phone" signal continues for a long time and picture information for a plurality of pages is transmitted during this period, all the picture information or the plurality of pages is resent.

Figure 10:
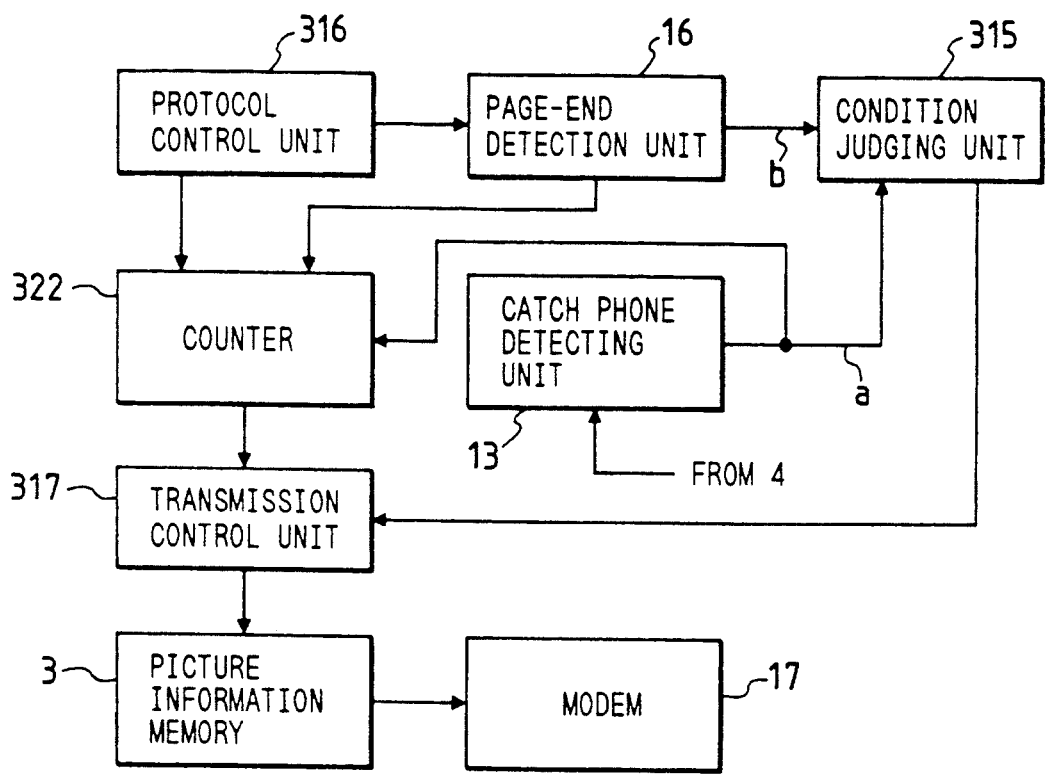
FIG. 10 is a block diagram showing essential functions of a fourth embodiment of the present invention.

FIG. 10 is a block diagram showing the essential elements of the fourth embodiment, in which the same reference numerals as those in FIG. 9 denote the same or equivalent elements.

Referring to FIG. 10, when both the signals supplied from the "catch phone" detecting unit 13 and the page-end detecting unit 16 become high in level, the condition judging unit 315 sends out a starting signal to the transmission control unit 317. In other words, the condition judging unit 315 functions as an AND gate which is supplied with the signals "a" and "b" as input signals.

When one transmission is initiated, the page number on the counter 322 is reset to "1", and thereafter the count value is incremented each time a page-end signal is detected. In other words, the counter 322 indicates the page number of the picture information presently communicated. The counter 322 outputs to the transmission control unit 317 the count value at the time when the "catch phone" detecting signal "a" sent out from the "catch phone" detecting signal "a" sent out from the "catch phone" detecting unit 13 changes to the high level and the count value at the time when the signal "a" changes to the low level. The transmission control unit 317 is arranged to be capable of recognizing by the count value the number of pages of picture information transmitted while the "catch phone" signal is being received.

The transmission control unit 317 responds to a starting signal supplied from the condition judging unit 315 and gives the picture information memory 3 an output instruction for resending the picture information corresponding to the number of pages that is recognized by the count values. In response to the output instructing signal, the picture information memory 3 outputs predetermined picture information to the modem 17.

Figure 11:
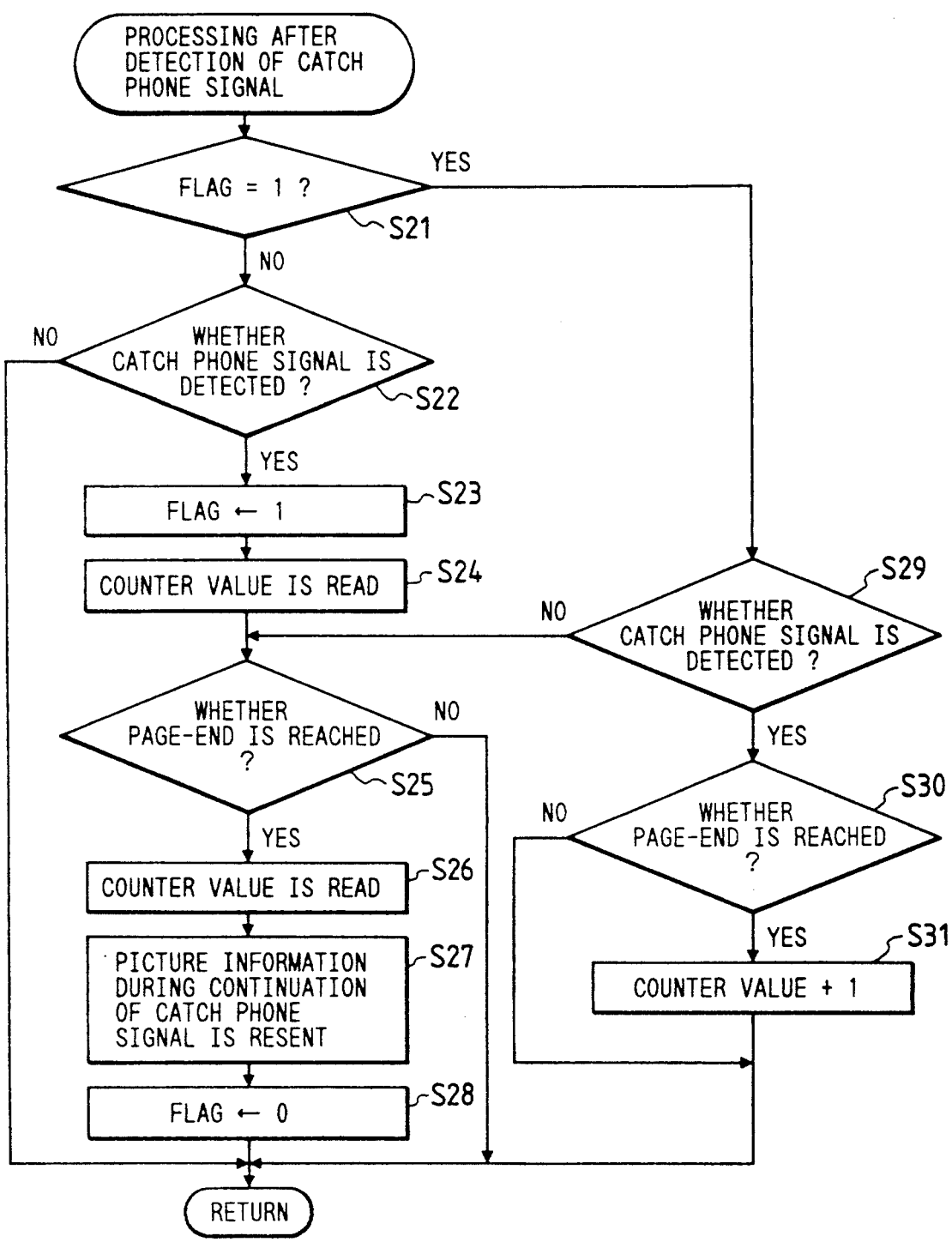
FIG. 11 is a flowchart showing the operation of the fourth embodiment.

Next, the operation of the fourth embodiment will be explained. FIG. 11 is a flowchart showing the processing executed after a "catch phone" signal is detected in the fourth embodiment.

Referring to FIG. 11, it is judged at Step S21 whether or not a "catch phone" signal has been detected in the proceeding processing by judging whether or not a flag is up (i.e., the flag=1). If no "catch phone" signal has been detected in the preceding processing, the process proceeds to Step S22, where it is judged whether or not a "catch phone" signal is detected. If NO, the process returns to the main routine without executing any processing.

If a "catch phone" signal is detected, the process to Step S23, where the flag is set (i.e., "1" is set). At Step S24, the value of the counter 322 is read. In other words, the page of the original document that is presently transmitted is stored in the transmission control unit 317.

It is judged at Step S25 whether or not the page end has been reached, that is, whether or not the communication for the page presently communicated has been completed.

If the page end has been reached, the process proceeds to Step S26, where the value of the counter 322 is read. Since the count value immediately after the detection of the "catch phone" signal has not yet been updated, the count value at this time is the same as the value read at Step S24.

At Step S27, the picture information of page(s) transmitted during the period that the "catch phone" signal continued is read out from the picture information memory 3 and resent. The page(s) sent during the "catch phone" signal continuance period can be decided on the basis of the count value read when the "catch phone" signal was first detected, that is, the value read at Step S24, and the present value of the counter 322, that is, the value read at Step S26. For example, if it is judged that the page end has been reached immediately after the count value was first stored at Step S24, the count value has not yet been updated; in such a case, picture information for one page is resent.

At Step S28, the flag is cleared (i.e., "0" is set).

On the other hand, if the flag is set at Step S21, it is judged that the "catch phone" signal was detected in the preceding processing, and the process then proceeds to Step S29.

It is judged at Step S29 whether or not a "catch phone" signal is detected. In other words, it is judged whether or not the "catch phone" signal has continued since the preceding processing. If YES, the process proceeds to Step S30, whereas, if it is judged that the "catch phone" signal has stopped, the process proceeds to Step S25.

At Step S30, it is judged whether or not the page end has been reached. If YES, the process proceeds to Step S31, where the value of the counter 322 is incremented (+1). If the page end has not yet been reached, step S31 is skipped.

Thus, in the fourth embodiment, the count value is incremented each time a page end is detected as long as a "catch phone" signal continues, and when a page end is reached after the disappearance of the "catch phone" signal, picture information for pages recognized by the count value is resent.

Although in the foregoing embodiments the transmission of picture information between facsimile apparatuses has been exemplarily described, it is also possible to execute processing in the same way as in the described embodiments in data communication between data communication apparatuses in which personal computers are used as terminal devices.

Although in the foregoing embodiments the "catch phone" signal of 400 Hz is detected as a circuit connection request signal, it is a matter of course that the same advantageous effects as those in the described embodiments are obtained in regard to other types of call signal, for example, the call signal that is employed in ATT, voice, music, etc., by modifying the "catch phone" detecting unit to detect such a call signal.

To detect voice or music, the "catch phone" detecting unit may be arranged to make a judgement according to whether a carrier signal is present or not, for example, or it may be arranged to be capable of detecting a plurality of signals of different frequencies in addition to the carrier signal, thereby discriminating voice or music from picture information or other data.

It is also possible to enable the operator to make selection, as desired, as to whether or not to make the apparatus execute a data resending operation as in the described embodiments by actuating a switch that is provided on the control panel 6. Such selecting means is effective in a case where picture information can be satisfactorily used even if it is somewhat disturbed by a noise, depending upon the kind of the data to be transmitted.

All is clear from the foregoing description, according to the present invention, when an interruption comes in the transmitting station during communication, the circuit is not cut off unconditionally, but it is possible to resend picture information with minimal opening of the circuit by taking into consideration the duration of the interruption signal with respect to the time required to transmit a predetermined unit of data.

When an interruption continues over a plurality of units of data during data communication, the transmission is not suspended, but all the data transmitted during this period can be resent.

As a result, it is possible to eliminate the waste of time consumed for the processing which would otherwise be needed after the circuit is opened.

What is claimed is:

1. A data communication apparatus which receives a communication in predetermined units from a remote station, comprising:
    means for detecting an interruption request signal from a source different from the remote station received during receipt of the communication; and
    means for transmitting communication unit resending request information to the remote station in the form of protocol information in response to detecting a signal from said detecting means upon detection of said interruption request signal without interrupting the communication.

2. A data communication apparatus according to claim 1, further comprising:
    means for storing received communication units; and
    means for erasing from the storing means communication units received at the time of detection of said interruption request signal.

3. A data communication apparatus according to claims 1 or 2, further comprising display means for informing an operator that said communication unit resending request information has been transmitted.

4. A data communication apparatus which transmits data to a remote station, comprising:
    means for storing data to be transmitted;
    protocol information analyzing means for detecting data resending request information received from the remote station, the remote station transmitting the data resending request information in response to an interruption request originating from a source different from the remote station and not responded to by the remote station; and
    means for reading, in response to a detecting signal from said protocol information analyzing means, a predetermined unit of data transmitted from said means for storing data immediately before the reception of said detecting signal and for transmitting said predetermined unit of data to the remote station.

5. A data communication apparatus which transmits data to a remote station, comprising:
    means for detecting, without interrupting data transmission, generation and disappearance of a circuit connection request signal from a third station received during a transmission of data to the remote station;
    means for detecting completion of a transmission of a predetermined unit of data; and
    condition judging means for judging whether or not a sequence relationship between the completion of the transmission of a predetermined unit of data and the disappearance of said circuit connection request signal satisfies a plurality of predetermined conditions;
    wherein predetermined processes including a process of resending at least a predetermined unit of data transmitted at the time of generation of said circuit connection request signal are executed in accordance with the result of a judgement made by said condition judging means.

* * * * *